(12) United States Patent
Harp

(10) Patent No.: US 10,313,271 B2
(45) Date of Patent: Jun. 4, 2019

(54) PROVIDING AND USING A DISTRIBUTED FORWARDING SERVICE

(71) Applicant: AT&T Intellectual Property I, L.P., Atlanta, GA (US)

(72) Inventor: Gregory O. Harp, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 463 days.

(21) Appl. No.: 15/071,813

(22) Filed: Mar. 16, 2016

(65) Prior Publication Data

US 2017/0272383 A1    Sep. 21, 2017

(51) Int. Cl.
| | |
|---|---|
| *H04L 12/947* | (2013.01) |
| *H04L 29/06* | (2006.01) |
| *H04L 12/743* | (2013.01) |
| *H04L 12/803* | (2013.01) |
| *H04L 29/08* | (2006.01) |

(52) U.S. Cl.
CPC .......... *H04L 49/25* (2013.01); *H04L 45/7453* (2013.01); *H04L 47/125* (2013.01); *H04L 67/2814* (2013.01); *H04L 69/22* (2013.01)

(58) Field of Classification Search
CPC ....... H04L 49/25; H04L 47/125; H04L 69/22; H04L 45/7453
See application file for complete search history.

(56) References Cited

U.S. PATENT DOCUMENTS

| | | | |
|---|---|---|---|
| 7,606,929 B2 | 10/2009 | Gbadegesin et al. | |
| 8,259,726 B2 | 9/2012 | Subramanian et al. | |
| 8,341,362 B2* | 12/2012 | Akerib | G09G 5/06 345/560 |
| 8,533,251 B2* | 9/2013 | Brokenshire | G06F 17/16 708/514 |
| 8,676,980 B2 | 3/2014 | Kreeger et al. | |
| 8,693,470 B1 | 4/2014 | Maxwell et al. | |
| 8,942,256 B1 | 1/2015 | Barth et al. | |
| 8,966,029 B2 | 2/2015 | Zhang et al. | |
| 10,122,647 B2* | 11/2018 | Lagerholm | H04L 47/70 |
| 2010/0017450 A1* | 1/2010 | Sun | G06F 7/785 708/401 |
| 2011/0276695 A1* | 11/2011 | Maldaner | G06F 9/5083 709/226 |
| 2011/0286457 A1 | 11/2011 | Ee et al. | |

(Continued)

*Primary Examiner* — Mounir Moutaouakil

(74) *Attorney, Agent, or Firm* — Hartman & Citrin LLC

(57) ABSTRACT

Concepts and technologies are disclosed herein for providing and using a distributed forwarding service. A service request can be received at a computing device and can relate to a distributed forwarding service. The computing device can configure the distributed forwarding service by determining a number of nodes that are to provide the distributed forwarding service and configuring a shared control function to control the nodes. The computing device can trigger instantiation of the distributed forwarding service. Instantiation of the distributed forwarding service can include dedicating a shared incoming switch for the distributed forwarding service, dedicating a shared outgoing switch for the distributed forwarding service, instantiating the nodes, and instantiating the shared control function. The distributed forwarding service can include the shared incoming switch, the shared control function, the nodes, and the shared outgoing switch.

20 Claims, 6 Drawing Sheets

(56) References Cited

U.S. PATENT DOCUMENTS

| | | | |
|---|---|---|---|
| 2013/0016719 A1 | 1/2013 | Johnsen et al. | |
| 2014/0164617 A1 | 6/2014 | Jalan et al. | |
| 2014/0204761 A1 | 7/2014 | Durrani et al. | |
| 2014/0244785 A1* | 8/2014 | Potlapally | H04L 67/10 709/217 |
| 2014/0310390 A1 | 10/2014 | Sorenson, III et al. | |
| 2014/0369204 A1* | 12/2014 | Anand | H04L 47/125 370/235.1 |
| 2015/0063364 A1 | 3/2015 | Thakkar et al. | |
| 2015/0334179 A1* | 11/2015 | Eisenbud | H04L 67/1002 709/226 |

\* cited by examiner

PROVIDING AND USING A DISTRIBUTED FORWARDING SERVICE

BACKGROUND

Over the past several years, some network operations have embraced the notion of virtualization to address elasticity and/or other dynamic aspects of network demand. For example, creation and scaling of some services have evolved over the past several years from a first model that can be based on deploying dedicated and closely tied hardware and software to networks, to a second model that can instead be based upon embracing virtualization of services and service components.

In one approach to virtualization, network appliances can be emulated by virtual copies of those appliances. Thus, instead of a physical server with a particular application being deployed to a network, one approach to virtualization can entail creating a copy of the physical server and application by way of a virtual machine that executes the application and deploying this virtual copy to the network. The services therefore can be installed on and hosted by commercial-off-the-shelf ("COTS") hardware, which can reduce costs and lead time for deploying an application, as well as allowing flexibility in terms of scaling, locating, and/or using the services.

One drawback, however, is that processing and memory storage resources associated with the hardware are still at a premium and still are required to provide the functionality that is being virtualized. In fact, because it has become easier to deploy new services and applications, the demand for these flexible resources has become higher, which in turn has put pressure on processing and memory resources needed to support various new applications and/or services.

SUMMARY

The present disclosure is directed to providing and using a distributed forwarding service. A computing device can execute a service creation module that can be configured to create a distributed forwarding service. The computing device can receive a request to create or scale forwarding functionality. The request can be created by a requestor or other entity, and can be submitted to or created at the computing device via a web portal, API, or other functionality. The computing device can analyze the service request and determine, based upon the service request, what type of forwarding functionality is requested by the service request, as well as capacity and/or other characteristics of the requested functionality. The computing device can configure the scaled or to-be-newly created distributed forwarding service. In some instances, the computing device can determine a number of nodes that are being created and/or added to the distributed forwarding service to fulfill the service request. The computing device also can configure a control function for the distributed forwarding service.

The computing device can trigger instantiation of the distributed forwarding service. In the case of a scaling request, the instantiation can refer to scaled capacity and/or associated nodes instead of all nodes. In some embodiments, the instantiation can include dedicating incoming and outgoing switches for the distributed forwarding service, instantiation of a pool of nodes, and instantiation of a control function. In the case of scaling, the instantiation can include instantiation of new nodes and reconfiguration of the control function. The distributed forwarding service can receive traffic and extract packets from the traffic (or receive the traffic as packets). The packets can be analyzed and/or operations can be performed on the packets to distribute the packets across the multiple nodes that provide the functionality associated with the distributed forwarding service. The packets can be forwarded by the nodes to their destination ports and/or destination IP addresses.

Some embodiments of the distributed forwarding service illustrated and described herein can provide forwarding of packets without replicating forwarding devices (whether real or virtual). Thus, some embodiments of the concepts and technologies described herein can provide and/or increase forwarding capacity by instantiating multiple nodes (e.g., the hosts, which collectively host functionality associated with the distributed forwarding service) and controlling those nodes using a central control function. Because each of the nodes does not require its own dedicated switches and a control function, some embodiments of the concepts and technologies described herein can reduce network overhead in terms of bandwidth, network transport requirements, compute resource requirements, memory storage requirements, and/or other resource requirements.

According to one aspect of the concepts and technologies disclosed herein, a system is disclosed. The system can include a processor and a memory. The memory can store computer-executable instructions that, when executed by the processor, cause the processor to perform operations. The operations can include receiving a service request that relates to a distributed forwarding service, configuring the distributed forwarding service, where configuring the distributed forwarding service can include determining a number of nodes that are to provide the distributed forwarding service and configuring a shared control function to control the nodes, and triggering instantiation of the distributed forwarding service. Instantiation of the distributed forwarding service can include dedicating a shared incoming switch for the distributed forwarding service, dedicating a shared outgoing switch for the distributed forwarding service, instantiating the nodes, and instantiating the shared control function. The distributed forwarding service can include the shared incoming switch, the shared control function, the nodes, and the shared outgoing switch.

In some embodiments, the system can further include a computing environment. The distributed forwarding service can be executed by multiple hosts within the computing environment. In some embodiments, the computing environment can include a data center. In some embodiments, the request can include a request to create the distributed forwarding service. In some embodiments, the request can include a request to scale the distributed forwarding service. In some embodiments, the shared incoming switch can be configured to distribute packets across the nodes to balance load across the nodes. In some embodiments, the shared incoming switch can apply a hash algorithm to a header associated with each of the packets, and distributes each of the packets based on a hash generated using the hash algorithm. In some embodiments, the distributed forwarding service can be created without replicating processing and/or storage devices associated with a shared forwarding device.

According to another aspect of the concepts and technologies disclosed herein, a method is disclosed. The method can include receiving, at a computing device that includes a processor that executes a service creation module, a service request. The service request can include a request that relates to a distributed forwarding service. The method also can include configuring, by the computing device, the distributed forwarding service. Configuring the distributed forwarding service can include determining a number of nodes that are to provide the distributed forwarding service and configuring a shared control function to control the nodes. The method also can include triggering, by the computing device, instantiation of the distributed forwarding service. Instantiation of the distributed forwarding service can include dedicating a shared incoming switch for the distributed forwarding service, dedicating a shared outgoing switch for the distributed forwarding service, instantiating the nodes, and instantiating the shared control function. The distributed forwarding service can include the shared incoming switch, the shared control function, the nodes, and the shared outgoing switch.

In some embodiments, the request can include a request to create the distributed forwarding service. In some embodiments, the request can include a request to scale the distributed forwarding service. In some embodiments, each of the nodes can include a host, and the nodes collectively can execute the distributed forwarding service. In some embodiments, the service request can be received at the service creation module via an application programming interface exposed by the computing device. In some embodiments, the shared incoming switch can be configured to distribute packets across the nodes to balance load across the nodes. In some embodiments, the shared incoming switch can apply a hash algorithm to a header associated with each of the packets and can distribute each of the packets based on a hash generated using the hash algorithm. In some embodiments, the distributed forwarding service can be created without replicating processing and storage devices associated with a shared forwarding device.

According to yet another aspect of the concepts and technologies disclosed herein, a computer storage medium is disclosed. The computer storage medium can have computer-executable instructions stored thereon that, when executed by a processor, cause the processor to perform operations. The operations can include receiving a service request that can include a request that relates to a distributed forwarding service; configuring the distributed forwarding service, where configuring the distributed forwarding service can include determining a number of nodes that are to provide the distributed forwarding service and configuring a shared control function to control the nodes; and triggering instantiation of the distributed forwarding service. Instantiation of the distributed forwarding service can include dedicating a shared incoming switch for the distributed forwarding service, dedicating a shared outgoing switch for the distributed forwarding service, instantiating the nodes, and instantiating the shared control function. The distributed forwarding service can include the shared incoming switch, the shared control function, the nodes, and the shared outgoing switch.

In some embodiments, each of the nodes can include a host, and the nodes collectively can execute the distributed forwarding service. In some embodiments, the shared incoming switch can be configured to distribute packets across the nodes to balance load across the nodes by applying a hash algorithm to a header associated with each of the packets and distributing each of the packets based on a hash generated using the hash algorithm. In some embodiments, the distributed forwarding service can be created without replicating processing and storage devices associated with a shared forwarding device.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to providing and using a distributed forwarding service. A computing device can execute a service creation module that can be configured to create a distributed forwarding service. The computing device can receive a request to create or scale forwarding functionality. The request can be created by a requestor or other entity, and can be submitted to or created at the computing device via a web portal, API, or other functionality. The computing device can analyze the service request and determine, based upon the service request, what type of forwarding functionality is requested by the service request, as well as capacity and/or other characteristics of the requested functionality. The computing device can configure the scaled or to-be-newly created distributed forwarding service. In some instances, the computing device can determine a number of nodes that are being created and/or added to the distributed forwarding service to fulfill the service request. The computing device also can configure a control function for the distributed forwarding service.

The computing device can trigger instantiation of the distributed forwarding service. In the case of a scaling request, the instantiation can refer to scaled capacity and/or associated nodes instead of all nodes. In some embodiments, the instantiation can include dedicating incoming and outgoing switches for the distributed forwarding service, instantiation of a pool of nodes, and instantiation of a control function. In the case of scaling, the instantiation can include instantiation of new nodes and reconfiguration of the control function. The distributed forwarding service can receive traffic and extract packets from the traffic (or receive the traffic as packets). The packets can be analyzed and/or operations can be performed on the packets to distribute the packets across the multiple nodes that provide the functionality associated with the distributed forwarding service. The packets can be forwarded by the nodes to their destination ports and/or destination IP addresses.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
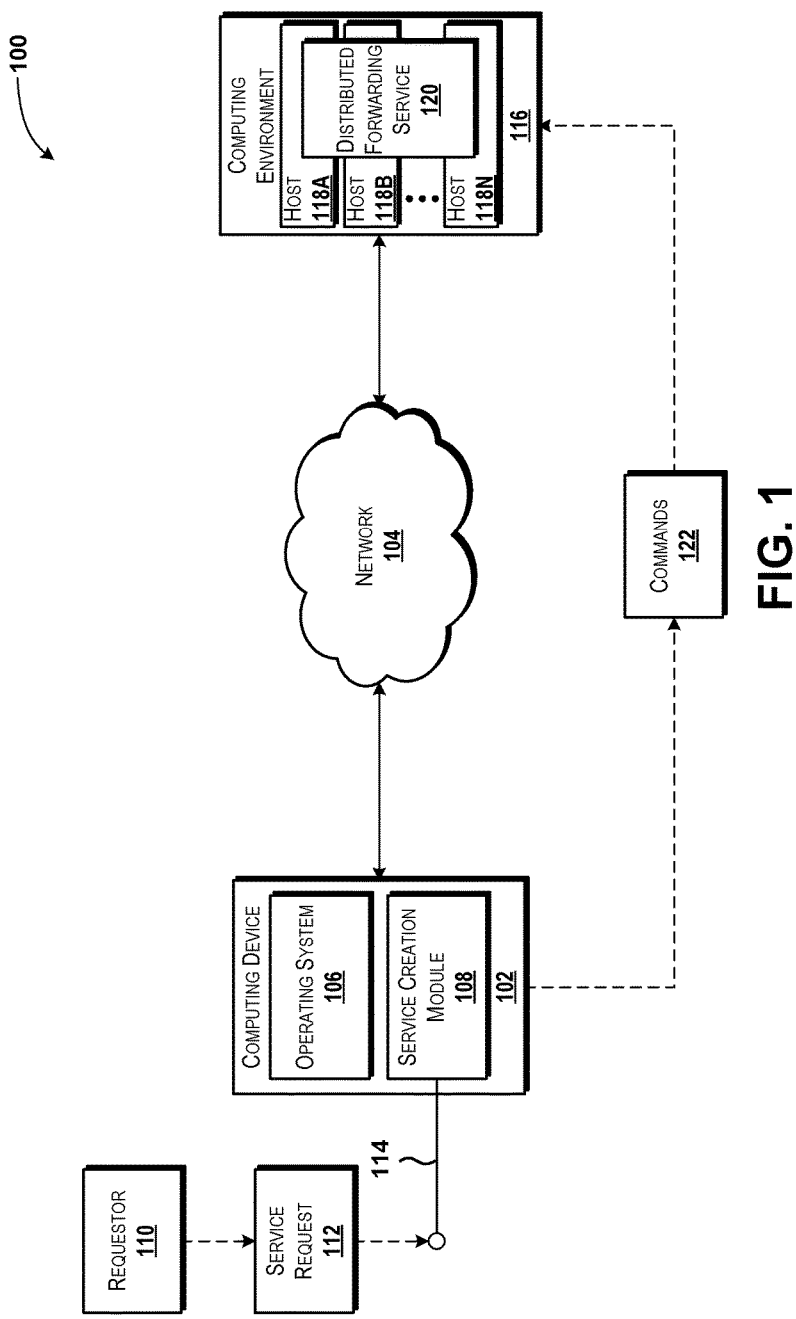
FIG. 1 is a system diagram illustrating an illustrative operating environment for various embodiments of the concepts and technologies described herein.

Referring now to FIG. 1, aspects of an operating environment 100 for various embodiments of the concepts and technologies disclosed herein for providing and using a distributed forwarding service will be described, according to an illustrative embodiment. The operating environment 100 shown in FIG. 1 includes a computing device 102. The computing device 102 can operate in communication with and/or as part of a communications network ("network") 104, though this is not necessarily the case.

According to various embodiments, the functionality of the computing device 102 may be provided by one or more server computers, desktop computers, mobile telephones, laptop computers, set-top boxes, other computing systems, and the like. It should be understood that the functionality of the computing device 102 can be provided by a shared device, by two similar devices, and/or by two or more dissimilar devices. For purposes of describing the concepts and technologies disclosed herein, the computing device 102 is described herein as a server computer. It should be understood that this embodiment is illustrative, and should not be construed as being limiting in any way.

The computing device 102 can execute an operating system 106 and one or more application programs such as, for example, a service creation module 108. The operating system 106 can include a computer program for controlling the operation of the computing device 102. The service creation module 108 can include an executable program configured to execute on top of the operating system 106 to provide various functions illustrated and described herein. The functionality of the service creation module 108 will be discussed in more detail below after introducing other components of the operating environment 100.

As shown in FIG. 1, the operating environment 100 can include a requestor 110. The requestor 110 can correspond to any computing device, user device, or other device that can be associated with a network operator, a network engineer, a customer, or other user or entity. In some embodiments, the requestor 110 also can correspond to a user of the service creation module 108, an application, a service, a module or program, combinations thereof, or the like. As such, the requestor 110 can correspond to almost any device that can be associated with almost any entity including, but not limited to, a person, an application, and/or other hardware, software, or the like.

The requestor 110 can communicate with the computing device 102 via various hardware and/or software such as web portals, service calls, application calls, combinations thereof or the like. In the illustrated embodiment, the requestor 110 can create a communication for creating a service ("service request") 112. The service request 112 can correspond to a request or service call to create or scale a particular application, module, or the like, as will be illustrated and described in more detail hereinbelow.

According to various embodiments of the concepts and technologies described herein, the service request 112 can be submitted to the service creation module 108 using a portal, application programming interface ("API"), or other functionality ("API") 114 that can be exposed by the computing device 102, the service creation module 108, and/or other devices, software, and/or other entities. The service request 112 can be used to trigger or request creation of the service associated with the service request 112, to trigger or request scaling of the service associated with the service request 112, or the like. Because creation or scaling of a service can be requested in other ways, and because the service request 112 can be created and/or submitted to the service creation module 108 in additional and/or alternative manners, it should be understood that the illustrated embodiment is illustrative and should not be construed as being limiting in any way.

The operating environment 100 also can include a computing environment 116. The computing environment 116 can correspond, in some embodiments, to a data center, a server farm, a distributed computing environment such as a cloud computing platform, or the like. The computing environment 116 also can correspond, in some other embodiments, to a shared computing device such as a server computer, or the like. In yet other embodiments, the computing environment 116 can correspond to a multi-processor and/or multicore processing system, a disk array, a personal computer, or the like. Thus, the computing environment 116 can correspond to one or more computing devices having one or more data storage devices and/or one or more processing devices. It should be understood that these examples are illustrative and therefore should not be construed as being limiting in any way.

According to various embodiments of the concepts and technologies described herein, the computing environment 116 can include two or more hosts 118A-N (hereinafter collectively and/or generically referred to as "hosts 118"). The hosts 118 can correspond, in some embodiments, to virtual machines. The hosts 118 can execute and/or host one or more virtual network functions and/or one or more virtual functions (e.g., application functions, service functions, or the like). Thus, it can be appreciated that the hosts 118 can provide one or more nodes of a service such as a distributed forwarding service 120. As used herein, a "node" can be used to refer to a virtual machine or other host that executes or hosts a service function, a control function, or other functionality associated with a service. It should be understood that this example is illustrative and therefore should not be construed as being limiting in any way.

According to various embodiments of the concepts and technologies described herein, the service creation module 108 also can be configured to instantiate the distributed forwarding service 120. According to various embodiments of the concepts and technologies described herein, the distributed forwarding service 120 can obviate a need to create multiple virtualized routers and/or associated control functions. Rather, as shown in FIG. 1 and as explained in more detail herein, the concepts and technologies described herein can be used to create or scale a distributed forwarding service 120. The distributed forwarding service 120 can be created and scaled by creating multiple computer nodes (illustrated as "hosts 118" in FIG. 1) that can perform the same or similar functions.

Thus, these nodes (e.g., the hosts 118) can provide a pool of forwarding capacity that can be controlled by a shared control function (not shown in FIG. 1). Thus, the nodes (e.g., the hosts 118) can collectively provide forwarding functionality via control by a shared control function. Also, the nodes may use a shared incoming switch and a shared outgoing switch instead of requiring dedicated switches and/or control functions. Thus, while previous approaches to scaling forwarding functionality in virtual networks has entailed creating multiple redundant instances of virtual routing and/or forwarding devices, the concepts and technologies described herein do not rely upon emulating network appliances (e.g., routers, firewalls, load balancers, gateways, or the like).

Rather, various embodiments of the concepts and technologies described herein can entail creating the nodes (e.g., the hosts 118) and distributing a service such as the distributed forwarding service 120 across those hosts 118 without requiring multiple redundant copies of control functions, switches, or the like. Thus, the concepts and technologies described herein can provide scaling of forwarding services without requiring multiple redundant copies of network appliances. It should be understood that these example benefits are illustrative of some possible benefits and may not be present in all implementations of the concepts and technologies described herein (based on other factors) and therefore should not be construed as being limiting in any way.

As such, some embodiments of the distributed forwarding service 120 illustrated and described herein can provide forwarding of packets without replicating forwarding devices (whether real or virtual). Instead, some embodiments of the concepts and technologies described herein can increase forwarding capacity by instantiating multiple nodes (e.g., the hosts 118, which collectively host functionality associated with the distributed forwarding service 120). These nodes can have a shared control function (illustrated and described below with reference to FIG. 2). Because each of the nodes does not require dedicated switches and a control function, this approach can reduce network overhead in terms of bandwidth, reduce network transport requirements, reduce compute resource requirements, reduce memory storage requirements, and/or reduce other resource requirements. As such, it can be appreciated that the embodiments of the concepts and technologies described herein for forwarding of traffic can reduce resource requirements for scaling forwarding functionality, reduce redundancy across a network, and otherwise simplify providing forwarding functionality in a network. It should be understood that these example benefits also are illustrative and therefore should not be construed as being limiting in any way.

As shown in FIG. 1, the service creation module 108 can be configured to generate one or more commands 122. The commands 122 can correspond to instructions that, when executed by a processor (not shown in FIG. 1) associated with the computing environment 116, cause the processor to instantiate and/or activate the distributed forwarding service 120. Thus, as will be explained in more detail below, particularly with reference to FIGS. 3-4, the commands 122 can be issued to instantiate the distributed forwarding service 120, to scale the distributed forwarding service 120, to trigger instantiation of the distributed forwarding service 120, to trigger scaling of the distributed forwarding service 120, and/or to otherwise effect or cause the instantiation, scaling, and/or activation of the distributed forwarding service 120. It should be understood that this example is illustrative and therefore should not be construed as being limiting in any way.

Although the service creation module 108 is illustrated as being executed by the computing device 102, it should be understood that the service creation module 108, as well as functionality thereof, may be embodied as or in stand-alone devices or components operating as part of or in communication with the network 104 and/or the computing device 102. As such, the illustrated embodiment should be understood as being illustrative of only some contemplated embodiments and should not be construed as being limiting in any way.

In practice, a computing device such as the computing device 102 can receive a request to create or scale forwarding functionality in a network such as the network 104. In some embodiments, the request can be provided to the computing device 102 as the service request 112, which can be submitted to or created at the computing device 102 via a web portal, API 114, or other functionality, if desired. The computing device 102 can analyze the service request 112 and determine, based upon the service request 112, what type of forwarding functionality is requested by the service request 112. The service request 112 can request, in some embodiments, scaling of forwarding functionality or creation of forwarding functionality. The service request 112 may also request replication of existing devices or services, but such requests may not be fulfilled by scaling or creating a distributed forwarding service 120, and as such are not addressed in further detail at this time.

In the case of a request for a distributed forwarding service 120 and/or scaling of a distributed forwarding service 120, the computing device 102 can configure the distributed forwarding service 120. Thus, the computing device 102 can determine a number of nodes that are being created and/or added to the distributed forwarding service 120 to fulfill the service request 112. The computing device 102 also can configure a control function for the distributed forwarding service 120. As illustrated and described in more detail herein, the nodes can be controlled by a shared control function, so the computing device 102 can configure that control function as well.

After configuring the distributed forwarding service 120, the computing device 102 can trigger instantiation of the distributed forwarding service 120. In the case of a scaling request, the instantiation can refer to scaled capacity and/or associated nodes instead of all nodes. In some embodiments, the instantiation can include dedicating incoming and outgoing switches for the distributed forwarding service 120, instantiation of a pool of nodes, and instantiation of a control function for the pool of nodes and the dedicated incoming and outgoing switches. In the case of scaling, the instantiation can include instantiation of new nodes and reconfiguration of the control function and/or dedicated incoming and outgoing switches (to add control of the new nodes and/or distribution of packets to the new nodes as will be more clearly understood after referring to FIG. 2). It should be understood that these examples are illustrative and therefore should not be construed as being limiting in any way.

The distributed forwarding service 120, when operational, can receive traffic and extract packets from the traffic. In some embodiments, the distributed forwarding service 120 can receive the traffic as packets, and therefore may or may not extract packets from received traffic. The packets can be analyzed by the distributed forwarding service 120 and/or operations can be performed on the packets to distribute the packets across the multiple nodes that provide the functionality associated with the distributed forwarding service 120. The packets can be forwarded by the nodes to their destination ports and/or destination IP addresses. Additional details of the distributed forwarding service 120 will be illustrated and described herein.

FIG. 1 illustrates one computing device 102, one network 104, one requestor 110, one computing environment 116, and one distributed forwarding service 120. It should be understood, however, that various implementations of the operating environment 100 can include zero, one, or more than one computing device 102; zero, one, or more than one network 104; zero, one, or more than one requestor 110; zero, one, or more than one computing environment 116; and/or zero, one, or more than one distributed forwarding service 120. As such, the illustrated embodiment should be understood as being illustrative, and should not be construed as being limiting in any way.

Figure 2:
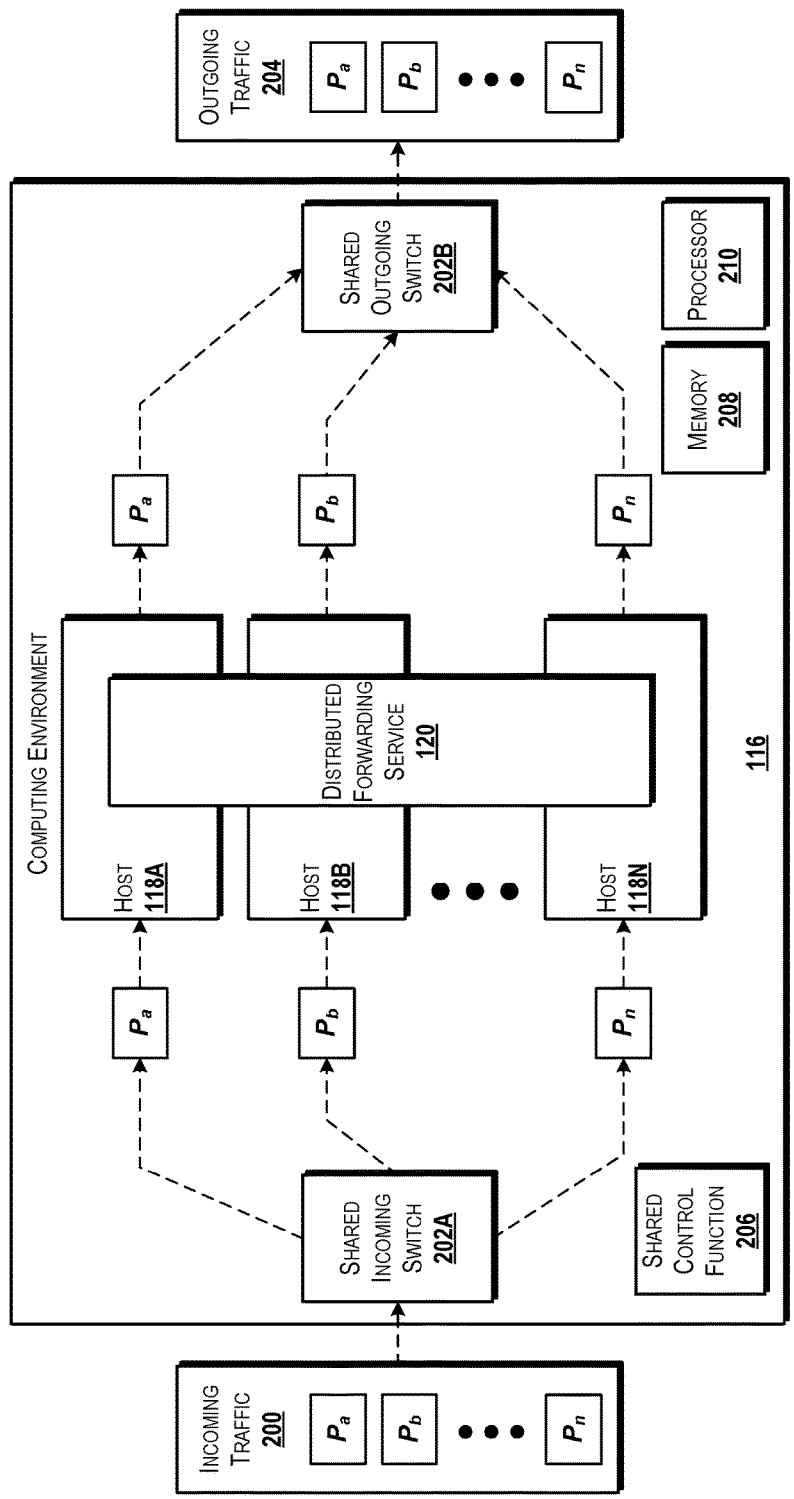
FIG. 2 is a block diagram illustrating aspects of a distributed forwarding service, according to various illustrative embodiments of the concepts and technologies described herein.

Turning now to FIG. 2, additional aspects of the distributed forwarding service 120 and the computing environment 116 will be described in detail, according to an illustrative embodiment of the concepts and technologies described herein. As shown in FIG. 2, the computing environment 116 can receive incoming traffic 200. The incoming traffic 200 can include data packets ("packets") $P_a, P_b, \ldots, P_n$. In some embodiments, the packets $P_a, P_b, \ldots, P_n$ can be streamed to the computing environment 116, while in some other embodiments, the packets $P_a, P_b, \ldots, P_n$ can be transmitted to the computing environment as a block of data, as a file, or the like. In yet other embodiments, the packets $P_a, P_b, \ldots, P_n$ can be downloaded, accessed, and/or otherwise obtained by the computing environment 116.

Regardless of how the incoming traffic 200 is arranged (streams of packets $P_a, P_b, \ldots, P_n$, blocks of data, files, or the like) and/or received by the computing environment 116, the incoming traffic 200 can be routed by a network 104 and/or devices associated therewith to a shared incoming switch 202A and/or a port associated with the shared incoming switch 202A. In some embodiments, the functionality of the incoming switch can be provided by a layer 2/3 switch, though this is not necessarily the case. The shared incoming switch 202A can be configured to distribute the packets $P_a, P_b, \ldots, P_n$ to the hosts 118 that provide the functionality of the nodes illustrated and described herein. According to some embodiments of the concepts and technologies described herein, the shared incoming switch 202A can be configured to apply a hash algorithm (e.g., a CRC16 of a five-tuple of {protocol, source IP address, destination IP address, source port, and destination port}) to effect distribution to the hosts 118 (the compute nodes). It should be understood that this example is illustrative and therefore should not be construed as being limiting in any way.

The nodes (e.g., the hosts 118 that collectively cooperate to provide the functionality associated with the distributed forwarding service 120) can process the packets $P_a, P_b, \ldots, P_n$ and forward the packets $P_a, P_b, \ldots, P_n$ toward their destination address, a destination port, and/or a destination device. In the illustrated embodiment, the distributed forwarding service 120 forwards the packets $P_a, P_b, \ldots, P_n$ to a shared outgoing switch 202B. The functionality of the shared outgoing switch 202B can be provided by a layer 2/3 switch, though this is not necessarily the case. Thus, the packets $P_a, P_b, \ldots, P_n$ can leave the computing environment 116 destined for their destinations (destination port, destination IP address, and/or destination device) as the outgoing traffic 204. It should be understood that this example is illustrative and therefore should not be construed as being limiting in any way.

As shown in FIG. 2, the computing environment 116 also can host a shared control function 206. The shared control function 206 can correspond to one or more virtual function or other type of software for controlling the distributed forwarding service 120. Thus, in some embodiments, the distributed forwarding service 120 illustrated and described herein includes at least two nodes (which can be provided by the hosts 118 hosting functionality associated with the distributed forwarding service 120) and a shared control function 206. It should be understood that this example is illustrative and therefore should not be construed as being limiting in any way.

The computing environment 116 also can include at least one memory or other data storage device ("memory") 208. The memory 208 can include various data storage devices and/or computer storage media as defined herein with reference to FIG. 6. The computing environment 116 also can include a processor 210. The processor 210 can include the various functionality illustrated and described herein with regard to the processor shown and described with reference to FIG. 6. It should be understood that this example is illustrative and therefore should not be construed as being limiting in any way.

The processor 210 can be configured to execute computer executable instructions stored in the memory 208. Execution of the computer executable instructions can cause the processor to provide the functionality illustrated and described herein with respect to the computing environment 116. It should be understood that this example is illustrative and therefore should not be construed as being limiting in any way.

Figure 3:
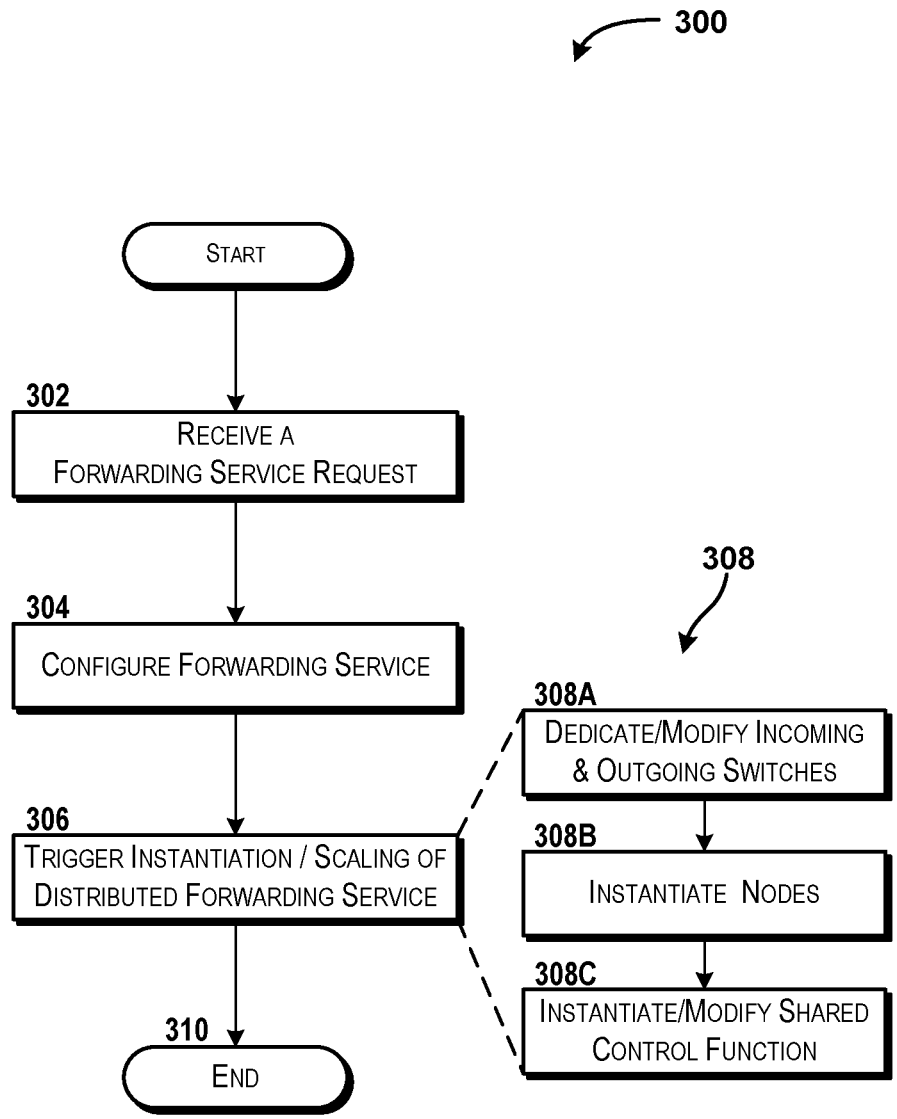
FIG. 3 is a flow diagram showing aspects of a method for instantiating or scaling a distributed forwarding service, according to an illustrative embodiment of the concepts and technologies described herein.

Turning now to FIG. 3, aspects of a method 300 for instantiating or scaling a distributed forwarding service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102 or the computing environment 116 to perform one or more operations and/or causing the processor to direct other components of the computing system or device to perform one or more of the operations.

For purposes of illustrating and describing the concepts of the present disclosure, the method 300 disclosed herein is described as being performed by the computing device 102 via execution of one or more software modules such as, for example, the service creation module 108. It should be understood that additional and/or alternative devices and/or network nodes can provide the functionality described herein via execution of one or more modules, applications, and/or other software including, but not limited to, the service creation module 108. Thus, the illustrated embodiments are illustrative, and should not be viewed as being limiting in any way.

The method 300 begins at operation 302. At operation 302, the computing device 102 can receive a forwarding service request. The forwarding service request can relate to a distributed forwarding service such as the distributed forwarding service 120 illustrated and described herein. According to various embodiments, the forwarding service request received in operation 302 can correspond to a request to create or scale a distributed forwarding service such as the distributed forwarding service 120. In various embodiments of the concepts and technologies described herein, the request received in operation 302 can include the service request 112 illustrated and described above with reference to FIG. 1. The request received in operation 302 can include feature and/or component data that can identify and/or describe one or more features that are requested by way of the request received in operation 302, a capacity requested in the new or scaled distributed forwarding service 120, and/or other aspects of operation associated with the distributed forwarding service 120. Because the request received in operation 302 can include additional and/or alternative information, it should be understood that this example is illustrative and therefore should not be construed as being limiting in any way.

The request received in operation 302 can be received from a requestor 110 and/or from other devices or entities. Also, the request received in operation 302 can be created via functionality exposed by the computing device 102 such as, for example, a portal, a web portal, an ordering platform, an API, combinations thereof, or the like, for example the API 114 illustrated and described in FIG. 1. Thus, the request may not actually be "received" in operation 302, as the request may be created and/or submitted via an API or portal exposed by the computing device 102. Thus, operation 302 can include detecting creation of the request, in some embodiments. It should be understood that this example is illustrative and therefore should not be construed as being limiting in any way.

From operation 302, the method 300 can proceed to operation 304. At operation 304, the computing device 102 can configure a distributed forwarding service 120. Operation 304 can include the computing device 102 analyzing the request received in operation 302, determining that features and/or scale is or are desired or requested, and determining how to configure the distributed forwarding service 120 based upon these and/or other determinations. Thus, for example, the computing device 102 can determine, in operation 304, a number of nodes that are to be instantiated to provide the functionality of the distributed forwarding service 120 and/or to provide the scaled functionality of the distributed forwarding service 120.

As explained above with reference to FIG. 2, a "node" can include a host 118 and the distributed forwarding service 120 executed by the host 118. As such, operation 304 can include determining a number of nodes to be instantiated by the computing device 102. According to various embodiments of the concepts and technologies described herein, the computing device 102 can determine the number of nodes to be instantiated based upon a determination of capacity associated with the distributed forwarding service 120. For example, the computing device 102 can determine that the distributed forwarding service 120 needs a particular capacity, and that a particular number of nodes are required or appropriate to provide the particular capacity. Thus, the computing device 102 can determine, in operation 304, a number of nodes to be instantiated based upon a desired, requested, or required capacity, and configure the distributed forwarding service 120 based upon the number of nodes determined. It should be understood that this example is illustrative and therefore should not be construed as being limiting in any way.

In operation 304, the computing device 102 also can determine how the distributed forwarding service 120 is to be controlled. As explained above, embodiments of the concepts and technologies described herein can support control of the distributed forwarding service 120 using a shared control function such as the shared control function 206 shown in FIG. 2. Thus, the computing device 102 also can determine, in operation 304, that the distributed forwarding service 120 is to be controlled by a shared control function 206, and can configure the shared control function 206 to control the multiple nodes. In the case of scaling, the computing device 102 can be configured to modify an existing control function such as the shared control function 206 to control new nodes associated with the distributed forwarding service 120 as scaled in response to the request. Still further, the computing device 102 can be configured to modify switches (e.g., the shared incoming switch 202A and the shared outgoing switch 202B) associated with the distributed forwarding service 120 to include new nodes in a distribution scheme in response to the request. Because other forms of configuration are possible and are contemplated, it should be understood that these examples are illustrative and therefore should not be construed as being limiting in any way.

In some instances of network operations, the computing device 102 can determine that a forwarding device (e.g., a virtual machine hosting a forwarding service by hosting a virtual network function and a virtual function) is to be replicated instead of creating a distributed forwarding service 120 as illustrated and described herein. In such an instance, the method 300 may not be performed and an existing device or service may instead be replicated (instead of creating the distributed forwarding service 120 illustrated and described herein). Thus, some embodiments of the method 300 can include an operation for the computing device 102 determining, based upon various network conditions and/or needs, that a distributed forwarding service 120 should be created instead of replicating a forwarding device or forwarding service. Such an operation may exist in the method 300 before operation 302, in some embodiments, though this is not separately shown in FIG. 3. It should be understood that this example is illustrative and therefore should not be construed as being limiting in any way.

From operation 304, the method 300 can proceed to operation 306. At operation 306, the computing device 102 can trigger instantiation of the distributed forwarding service 120 and/or nodes associated with a scaled version of the distributed forwarding service 120. As shown in FIG. 1, the computing device 102 can generate and/or transmit one or more commands 122, in some embodiments, to trigger instantiation of the distributed forwarding service 120, to trigger modifications to a shared control function 206, and/or to modify various aspects of the shared incoming switch 202A and/or the shared outgoing switch 202B. In some other embodiments, the computing device 102 can instruct other devices or entities, e.g., an orchestrator or orchestration service (not shown in the FIGURES), to instantiate, scale, and/or modify operation of the distributed forwarding service 120. In some other embodiments, the computing device 102 can instantiate, scale, and/or modify the operation of the distributed forwarding service 120 itself. As such, operation 306 can include the computing device 102 loading functions to the hosts 118, triggering loading of functions to the hosts 118, and/or otherwise prompting or triggering instantiation of the distributed forwarding service 120.

In some embodiments, operation 306 can include methods, routines, or other operations such as the routine 308. In the embodiment shown in FIG. 3, operation 306 can include a first operation 308A. In operation 308A, the computing device 102 can identify and dedicate a shared incoming switch 202A and a shared outgoing switch 202B for the distributed forwarding service 120. As illustrated and described above with reference to FIG. 2, the shared incoming switch 202A can include a switch such as layer 2/3 switch and the shared outgoing switch 202B can include a switch such as a layer 2/3 switch. Because other types of real and/or virtual switches can provide the functionality illustrated and described herein for the incoming switch and the outgoing switch, it should be understood that these examples are illustrative and therefore should not be construed as being limiting in any way.

In the case of scaling, as mentioned above, operation 308A can include modifying operation of one or more of the shared incoming switch 202A and/or the shared outgoing switch 202B. Thus, for example, operation 308A can include the computing device 102 adding new nodes to a distribution scheme applied by the shared incoming switch 202A, for example. Similarly, operation 308A can include the computing device 102 adding new source nodes to a list of recognized or allowed sources for the shared outgoing switch 202B, for example. Because additional and/or alternative modifications may be made to one or more of the shared incoming switch 202A and/or the shared outgoing switch 202B, it should be understood that these examples are illustrative and therefore should not be construed as being limiting in any way.

From operation 308A, the routine 308 can proceed to operation 308B. In operation 308B, the computing device 102 can instantiate a pool of nodes for the distributed forwarding service 120. As illustrated and described herein, the "nodes" can include virtual machines and/or other hosts such as the hosts 118, which can host and/or execute the distributed forwarding service 120. Thus, in operation 308B, the computing device 102 can instantiate the pool of nodes that are to provide the functionality of the distributed forwarding service 120. In the case of scaling, operation 308B can include the computing device 102 instantiating or triggering instantiation of new nodes that will be used to support operation of the distributed forwarding service 120 or otherwise modifying the distributed forwarding service 120 to add the new nodes and/or capacity requested by way of the request received in operation 302.

From operation 308B, the routine 308 can proceed to operation 308C. In operation 308C, the computing device 102 can instantiate a control function for the pool of nodes of the distributed forwarding service 120. Thus, as illustrated and described above, the "nodes" in the pool of nodes can be controlled by a shared control function. Thus, instead of providing scaling of forwarding services by replicating routers, or the like, the concepts and technologies described herein can be used to create a pool of nodes that collectively provide the forwarding service, where the pool of nodes can be controlled by a shared control function. It should be understood that this example is illustrative and therefore should not be construed as being limiting in any way.

In the case of scaling, operation 308C can include the computing device 102 modifying operation of a shared control function 206 to reflect control of the new nodes and/or to control operation of the distributed forwarding service 120 across the nodes. Because additional and/or alternative modifications may be made to the shared control function 206, it should be understood that these examples are illustrative and therefore should not be construed as being limiting in any way.

As mentioned above, the routine 308 is one embodiment of how the distributed forwarding service 120 can be instantiated and/or scaled and therefore should not be viewed as being limiting in any way. Thus, it can be appreciated that the routine 308 can be performed in accordance with operation 306, or can be triggered by performance of the operation 306. Thus, execution of the routine 308 may or may not occur during performance of the method 300. It should be understood that this example is illustrative and therefore should not be construed as being limiting in any way.

From operation 306, the method 300 can proceed to operation 310. If the routine 308 is performed in association with performance of the method 300, the method 300 can proceed to operation 310 from operation 308C. The method 300 can end at operation 310.

Figure 4:
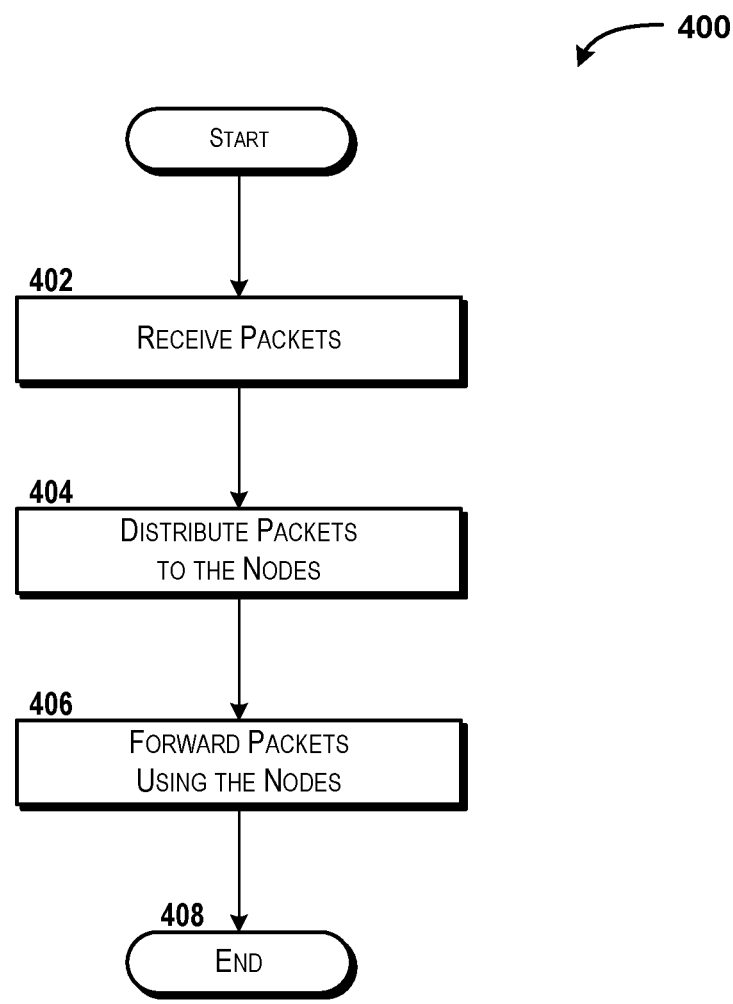
FIG. 4 is a flow diagram showing aspects of a method for operating or providing a distributed forwarding service, according to an illustrative embodiment of the concepts and technologies described herein.

Turning now to FIG. 4, aspects of a method 400 for operating or providing a distributed forwarding service 120 will be described in detail, according to an illustrative embodiment. For purposes of illustrating and describing the concepts of the present disclosure, the method 400 disclosed herein is described as being performed by the computing environment 116 (or the processor 210 of the computing environment 116) via execution of one or more software modules such as, for example, the distributed forwarding service 120. It should be understood that additional and/or alternative devices and/or network nodes can provide the functionality described herein via execution of one or more modules, applications, and/or other software including, but not limited to, the distributed forwarding service 120. Thus, the illustrated embodiments are illustrative, and should not be viewed as being limiting in any way.

The method 400 begins at operation 402. At operation 402, the computing environment 116 can receive data packets ("packets"). As illustrated and described above with reference to FIG. 2, the packets received in operation 402 can be included in incoming traffic such as the incoming traffic 200 illustrated and described above with reference to FIG. 2. As such, it can be appreciated that the packets received in operation 402 can correspond to streamed data packets, a received block of data, a received file, combinations thereof, or the like. As is known, the packets can include headers and/or the like, which can identify a protocol associated with the packet and/or the data (e.g., the incoming traffic 200), an origination IP address and/or destination IP address associated with the packet and/or the data, a source and/or destination port associated with the packet and/or the data, and/or other information such as a packet payload, bits, other types of data, combinations thereof, or the like. It therefore must be understood that the packets received in operation 402 can include any type of data packet.

In various embodiments of the concepts and technologies described herein, the packets received in operation 402 can be received at an incoming port associated with the distributed forwarding service 120. Thus, for example, the packets received in operation 402 can be received at an incoming switch such as the shared incoming switch 202A illustrated and described above with reference to FIG. 2. The shared incoming switch 202A can be configured to perform various operations on the packets such as, for example, header analysis, payload analysis, firewalling and/or deep packet inspection, combinations thereof, or the like. As such, although not separately illustrated in FIG. 4, it should be understood that the computing environment 116 can be configured to parse data from the packets, analyze headers, perform deep packet inspection, examine blacklists and/or port blocking information, apply firewall policies, combinations thereof, or the like.

From operation 402, the method 400 can proceed to operation 404. At operation 404, the computing environment 116 can distribute the packets received in operation 402 to the distributed forwarding service 120. According to various embodiments of the concepts and technologies described herein, the shared incoming switch 202A and/or the computing environment 116 can apply a hash algorithm to packet headers and/or other portions of the packets to create a hash. This hash can then be examined to distribute the packets to one of the multiple hosts 118. For example, a hash with a last digit between zero and four or a letter between "a" and "m," for example, can be distributed to a first host 118A, while a hash with a last digit between five and nine or a letter between "n" and "z" may be distributed to a second host 118B. It must be understood that this example is merely illustrative of how hash characters and/or values may be used to distributed packets to multiple hosts 118 to effect load balancing.

In some embodiments of the concepts and technologies described herein, a CRC16 hash algorithm is applied to the packet headers to create a hash value. The hash value therefore is a CRC16 hash of the packet headers, for example a five-tuple header consisting of {protocol, source IP address, destination IP address, source port, destination port}. These values can be used to distribute the packets across the hosts 118. Because the hosts 118 collectively execute the distributed forwarding service 120, this approach spreads work across the hosts 118 (and/or the associated nodes) and therefore allows the distributed forwarding service 120 to provide the functionality illustrated and described herein without overloading one node or host 118. It should be understood that this example is illustrative and therefore should not be construed as being limiting in any way.

It can be appreciated from the above that the distributed forwarding service 120 can provide forwarding of packets without replicating forwarding devices (whether real or virtual) by instead creating multiple nodes (e.g., the hosts 118, which collectively host functionality associated with the distributed forwarding service 120) and controlling those nodes using a shared control function 206 instead of replicating switches, control functions, and the like, across various hosts 118. It can be appreciated that this approach therefore reduces compute resources required for the forwarding functionality, reduces redundancy across a network, and therefore streamlines and simplifies providing forwarding functionality in a network. It should be understood that these benefits may not be realized in all embodiments of the concepts and technologies described herein, and as such, that these benefits are not necessarily required in every implementation of the concepts and technologies described herein. Thus, these example benefits are illustrative and therefore should not be construed as being limiting in any way.

From operation 404, the method 400 can proceed to operation 406. At operation 406, the computing environment 116 can forward the packets. In operation 406, the distributed forwarding service 120 can apply the forwarding functionality associated with the distributed forwarding service 120 to the packets, and thereby forward the packets to the appropriate destination. According to various embodiments of the concepts and technologies described herein, the distributed forwarding service 120 can examine the headers of the packets to determine the destination port and/or destination IP address associated with the packets. The distributed forwarding service 120 can then send the packets to the shared outgoing switch 202B to effect routing of the packets to their destination port and/or destination IP address. It should be understood that this example is illustrative and therefore should not be construed as being limiting in any way.

From operation 406, the method 400 can proceed to operation 408. The method 400 can end at operation 408.

The description refers to "shared" switches and control functions (e.g., the shared incoming switch 202A, the shared outgoing switch 202B, the shared control function 206, and the like). It should be understood that the "shared" functionality illustrated and described herein can refer to one or more instances of switches or control functions, but that the switches and control functions are provided in less than a one-to-one ratio relative to the nodes across which the distributed forwarding service 120 is distributed. Thus, for example, a shared control function 206 may control two or more nodes that host a distributed forwarding service 120, and therefore can be referred to as being "shared." Similarly, a shared incoming switch 202A and/or shared outgoing switch 202B may be used by two or more nodes that host a distributed forwarding service 120, and therefore can be referred to as being "shared." It should be understood that this example is illustrative and therefore should not be construed as being limiting in any way.

Additionally, the concepts and technologies described herein are described with reference to IP addresses. It should be understood that an IP address is one contemplated example of an address or network address. Thus, it should be understood that any layer 2/3 network technologies and/or other technologies may be used to define addresses as used herein. As such, the embodiment of an IP address is an example and should not be construed as being limiting in any way.

Additionally, the concepts and technologies described herein are often described with respect to traffic being provided as "packets." It should be understood that the concepts and technologies described herein can be used to provide forwarding of data in forms other than as packets. In particular, data in frames (e.g., Ethernet or Frame Relay), cells, bit streams, and/or other types of data can be provided in forms that include addressing information (e.g., a source, a destination, and the like) yet may not be packets. All such embodiments are included in the foregoing description and claims unless specifically excluded. Thus, it can be appreciated that some embodiments of the concepts and technologies described herein include data in the form of packets and not in any other form of data. Some other embodiments of the data illustrated and described herein includes data in any form including, but not limited to, packets. It should be understood that these examples are illustrative and therefore should not be construed as being limiting in any way.

Figure 5:
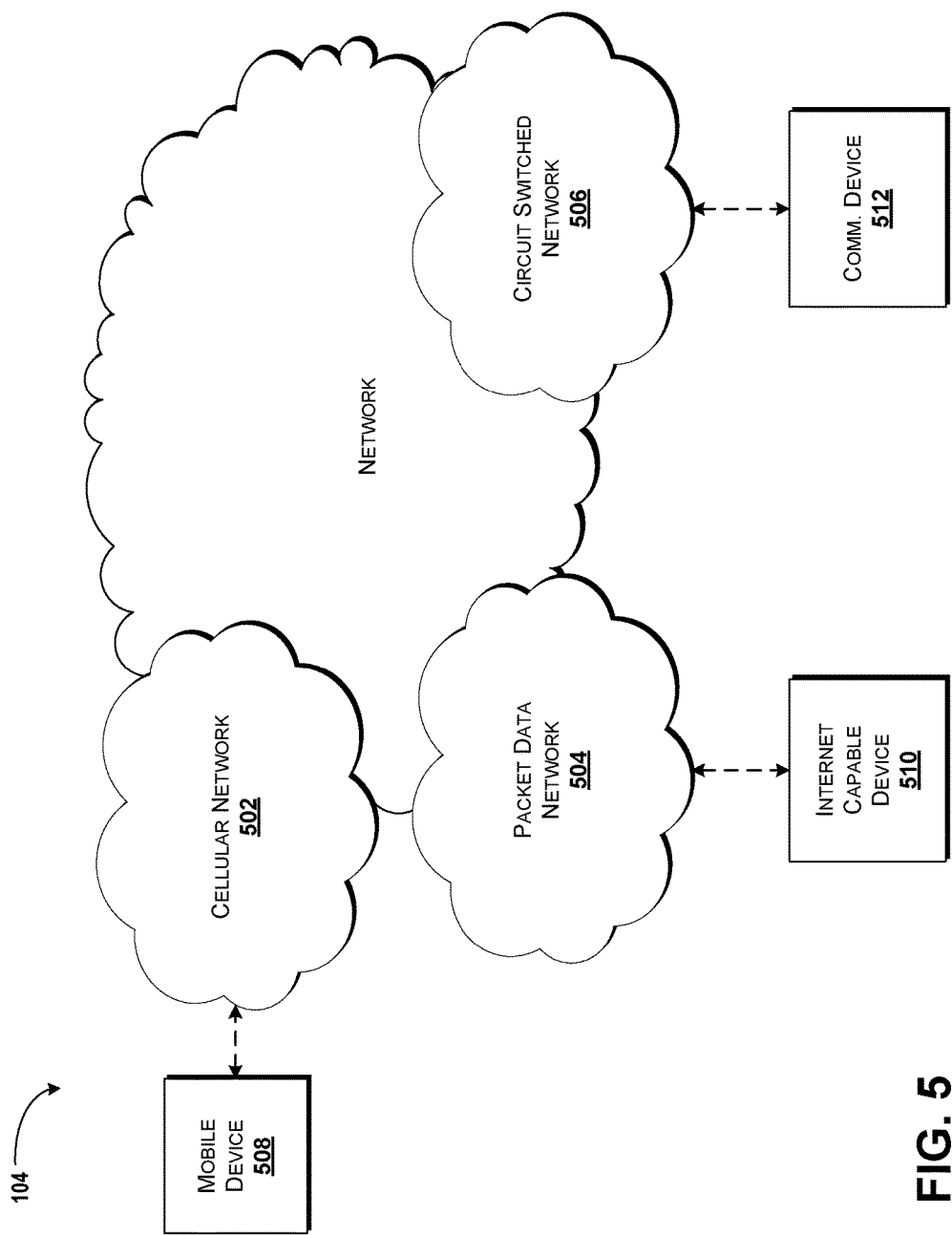
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
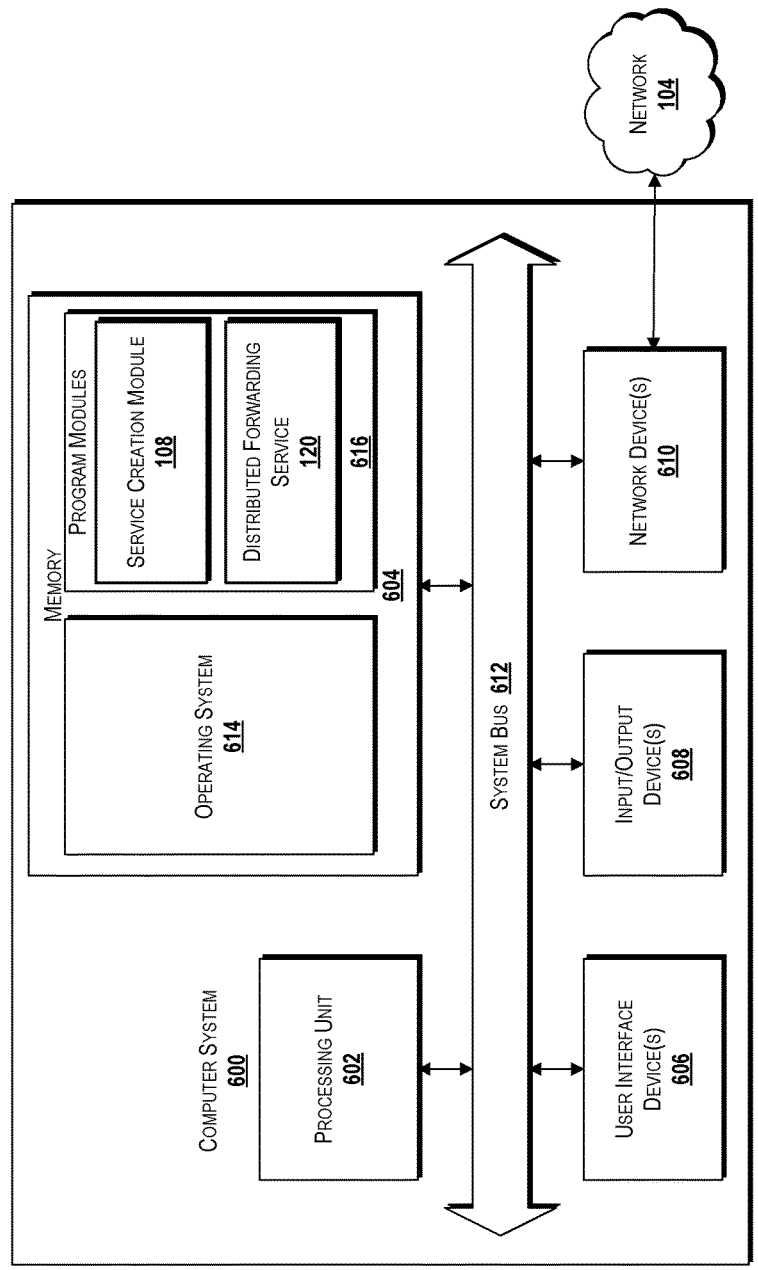
FIG. 6 is a block diagram illustrating an example computer system configured to provide, use, and/or support a distributed forwarding service, according to some illustrative embodiments of the concepts and technologies described herein.

FIG. 6 is a block diagram illustrating a computer system 600 configured to provide the functionality described herein for providing and using a distributed forwarding service, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the service creation module 108, the distributed forwarding service 120, and/or the shared control function 206 illustrated and described herein with reference to FIGS. 1-2. This and/or other programs can be embodied in computer-readable media containing instructions that, when executed by the processing unit 602, perform one or more of the methods 300 and 400 described in detail above with respect to FIGS. 3-4, as well as the routine 308 illustrated and described herein with reference to FIG. 3. According to embodiments, the program modules 616 may be embodied in hardware, software, firmware, or any combination thereof. Although not shown in FIG. 6, it should be understood that the memory 604 also can be configured to store the service request 112, the commands 122, the incoming traffic 200, the outgoing traffic 204, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing and using a distributed forwarding service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A system comprising:
a processor; and
a memory that stores computer-executable instructions that, when executed by the processor, cause the processor to perform operations comprising
receiving a service request, wherein the service request comprises a request that relates to a distributed forwarding service,
configuring the distributed forwarding service, wherein configuring the distributed forwarding service comprises determining a number of nodes that are to provide the distributed forwarding service and configuring a shared control function to control the nodes, and
triggering instantiation of the distributed forwarding service, wherein instantiation of the distributed forwarding service comprises
dedicating a shared incoming switch for the distributed forwarding service,
dedicating a shared outgoing switch for the distributed forwarding service, instantiating the nodes, and
instantiating the shared control function, wherein the distributed forwarding service comprises the shared incoming switch, the shared control function, the nodes, and the shared outgoing switch.

2. The system of claim 1, further comprising a computing environment, wherein the distributed forwarding service is executed by multiple hosts within the computing environment.

3. The system of claim 2, wherein the computing environment comprises a data center.

4. The system of claim 1, wherein the request comprises a request to create the distributed forwarding service.

5. The system of claim 1, wherein the request comprises a request to scale the distributed forwarding service.

6. The system of claim 1, wherein the shared incoming switch is configured to distribute packets across the nodes to balance load across the nodes.

7. The system of claim 6, wherein the shared incoming switch applies a hash algorithm to a header associated with each of the packets, and distributes each of the packets based on a hash generated using the hash algorithm.

8. The system of claim 1, wherein the distributed forwarding service is created without replicating processing and storage devices associated with a shared forwarding device.

9. A method comprising:
receiving, at a computing device comprising a processor that executes a service creation module, a service request, wherein the service request comprises a request that relates to a distributed forwarding service;
configuring, by the computing device, the distributed forwarding service, wherein configuring the distributed forwarding service comprises determining a number of nodes that are to provide the distributed forwarding service and configuring a shared control function to control the nodes; and
triggering, by the computing device, instantiation of the distributed forwarding service, wherein instantiation of the distributed forwarding service comprises
dedicating a shared incoming switch for the distributed forwarding service,
dedicating a shared outgoing switch for the distributed forwarding service,
instantiating the nodes, and
instantiating the shared control function, wherein the distributed forwarding service comprises the shared incoming switch, the shared control function, the nodes, and the shared outgoing switch.

10. The method of claim 9, wherein the request comprises a request to create the distributed forwarding service.

11. The method of claim 9, wherein the request comprises a request to scale the distributed forwarding service.

12. The method of claim 9, wherein each of the nodes comprises a host, and wherein the nodes collectively execute the distributed forwarding service.

13. The method of claim 9, wherein the service request is received at the service creation module via an application programming interface exposed by the computing device.

14. The method of claim 9, wherein the shared incoming switch is configured to distribute packets across the nodes to balance load across the nodes.

15. The method of claim 14, wherein the shared incoming switch applies a hash algorithm to a header associated with each of the packets, and distributes each of the packets based on a hash generated using the hash algorithm.

16. The method of claim 9, wherein the distributed forwarding service is created without replicating processing and storage devices associated with a shared forwarding device.

17. A computer storage medium having computer-executable instructions stored thereon that, when executed by a processor, cause the processor to perform operations comprising:
receiving a service request, wherein the service request comprises a request that relates to a distributed forwarding service;
configuring the distributed forwarding service, wherein configuring the distributed forwarding service comprises determining a number of nodes that are to provide the distributed forwarding service and configuring a shared control function to control the nodes; and
triggering instantiation of the distributed forwarding service, wherein instantiation of the distributed forwarding service comprises
dedicating a shared incoming switch for the distributed forwarding service,
dedicating a shared outgoing switch for the distributed forwarding service,
instantiating the nodes, and
instantiating the shared control function, wherein the distributed forwarding service comprises the shared incoming switch, the shared control function, the nodes, and the shared outgoing switch.

18. The computer storage medium of claim 17, wherein each of the nodes comprises a host, and wherein the nodes collectively execute the distributed forwarding service.

19. The computer storage medium of claim 17, wherein the shared incoming switch is configured to distribute packets across the nodes to balance load across the nodes by
applying a hash algorithm to a header associated with each of the packets, and
distributing each of the packets based on a hash generated using the hash algorithm.

20. The computer storage medium of claim 17, wherein the distributed forwarding service is created without replicating processing and storage devices associated with a shared forwarding device.

* * * * *